(12) United States Patent
Wagnon et al.

(10) Patent No.: US 8,193,760 B2
(45) Date of Patent: Jun. 5, 2012

(54) PORTABLE CART FOR SOLAR ENERGY CONVERSION

(76) Inventors: Dennis P. Wagnon, DeRidder, LA (US); Walter H. McManus, DeRidder, LA (US)

( * ) Notice: Subject to any disclaimer, the term of this patent is extended or adjusted under 35 U.S.C. 154(b) by 361 days.

(21) Appl. No.: 12/702,117

(22) Filed: Feb. 8, 2010

(65) Prior Publication Data

US 2011/0193513 A1     Aug. 11, 2011

(51) Int. Cl.
*H01M 10/44* (2006.01)
*H01L 31/042* (2006.01)
(52) U.S. Cl. .................................. 320/101; 136/244
(58) Field of Classification Search .................. 320/101; 136/244
See application file for complete search history.

(56) References Cited

U.S. PATENT DOCUMENTS

| | | | |
|---|---|---|---|
| 5,969,501 A * | 10/1999 | Glidden et al. ............... | 320/101 |
| 6,201,181 B1 | 3/2001 | Azzam et al. | |
| 6,396,239 B1 | 5/2002 | Benn et al. | |
| 6,974,904 B2 | 12/2005 | Azzam et al. | |
| 7,105,940 B2 | 9/2006 | Weesner et al. | |
| 7,469,541 B1 | 12/2008 | Melton et al. | |
| 7,492,120 B2 | 2/2009 | Benn et al. | |
| 7,795,837 B1 * | 9/2010 | Haun et al. ................... | 320/101 |
| 2002/0180404 A1 * | 12/2002 | Benn et al. ................... | 320/101 |
| 2008/0150473 A1 * | 6/2008 | Wise ............................. | 320/105 |

* cited by examiner

*Primary Examiner* — M'Baye Diao
(74) *Attorney, Agent, or Firm* — Warner J. Delaune; Baker Donelson, et al.

(57) ABSTRACT

A portable cart for solar energy conversion is provided comprising a cart having at least two wheels, wherein the cart includes a frame having a floor, a panel receiving assembly, and a panel holding assembly. The panel holding assembly is removably attachable to the panel receiving assembly. One or more photovoltaic solar panels is attached to the panel holding assembly; and voltage generated from the panels is directed to a charge controller. Electrical energy is stored in one or more batteries within the cart. The direct current from the batteries is directed to at least one inverter for producing AC power. An external stand is provided to mount the solar panels at a distance away from the cart. The external stand includes at least two positions to account for the position of the sun across the seasons. Optionally, the cart includes a charging receptacle for receiving a DC charge from an external source, such as an automobile.

16 Claims, 4 Drawing Sheets

PORTABLE CART FOR SOLAR ENERGY CONVERSION

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON COMPACT DISC

Not applicable.

BACKGROUND OF THE INVENTION

1. Field of the Invention

The present invention relates to the conversion of solar energy to electrical energy, and more particularly to portable carts having solar energy conversion features.

2. Description of Related Art

In the aftermath of severe storms, such as hurricanes and tornados, the power grid servicing homes and businesses in the affected area is often heavily damaged due to fallen utility poles and disconnected power lines. Such outages may last for several hours in some cases, or they may remain for weeks, depending on the severity of the damage and the availability of repair crews. When electrical power is lost after a hurricane, the suffering and inconvenience are often compounded by a lack of sufficient air conditioning, as well as loss of food within refrigerators and freezers within a matter of days. For these reasons, persons in affected areas have often resorted to gasoline or diesel powered generators to keep a variety of devices running, including fans, lights, refrigerators, and freezers, until conventional electrical power is restored.

However, gasoline and diesel generators have a number of distinct disadvantages. First, they require constant refueling at a time when petroleum-based fuels may be scarce or located far away. Second, some generators may require air permit or petroleum storage permits. Third, such generators are noisy due to their internal combustion engines, and they produce harmful carbon monoxide, making them unsuitable for use indoors or in poorly ventilated areas. Finally, to produce greater amounts of power, larger generators are required, further exacerbating the above problems due to their high fuel consumption.

In view of the problems with petroleum-based generators, photovoltaic solar panels have been used in a wide variety of situations. However, one challenge of using solar energy is that of providing a reasonably steady and continuous source of electricity for storage in batteries for use in powering appliances, lights, and other devices. For example, most renewable energy systems, such as solar and wind energy systems, are highly transient energy sources and exhibit strong variations in their energy outputs. Specifically, in the case of solar devices, high energy output is typically seen in the middle of the day during the summer months. Conversely, minimal energy output (or no output at all) is experienced during night time and during the winter months. Thus, they require proper means to store the energy produced in periods of low demand in order to stabilize the output when the demand is high.

Portability and remote operation of solar generation systems present several challenges, including the need to deliver a range of DC and AC voltages, frequencies and waveforms over widely divergent climate and weather conditions. Another challenge in the solar industry is that there is no standard size, shape and construction of solar modules. This variability typically has constrained users of solar modules to a single type or manufacturer of solar modules and limits opportunities to improve cost or performance for packaged systems. Moreover, the prior art devices were not adapted to readily receive multiple solar panels.

Compactness, stability and ease of assembly in the field are highly desirable for operation in remote locations. Prior art units, however, are often bulky or difficult to assemble. A design constraint for the cart assembly is that it must be adapted to hold storage devices, such as an array of batteries, which are typically much heavier when compared to the rest of the equipment. Prior systems were often unstable in the sense that they required the presence of a battery and the solar panel to remain in equilibrium. If the battery was removed and the panel was in place, often times the device would tip over, resulting in damage to both the panel as well as other components. Thus, it is important for a portable solar generator to incorporate a weight-balanced design that avoids these problems.

Accordingly, there is a need for a source of portable power that: (a) can be moved from location to location, (b) is not reliant on petroleum-based fuel, (c) does not cause or add to air pollution or noise pollution, (d) does not require environmental permitting, (e) remains structurally stable during removal and attachment of the solar panels and batteries; and (f) generates sufficient power for critical appliances, such as refrigerators, freezers, lights, and fans. Over the years, a number of devices have been developed to provide portable solar power, including U.S. Pat. No. 6,201,181 to Azzam; U.S. Pat. No. 6,396,239 to Benn; U.S. Pat. No. 6,974,904 to Azzam; U.S. Pat. No. 7,105,940 to Weesner; U.S. Pat. No. 7,492,120 to Benn; and U.S. Pat. No. 7,469,541 to Melton. While these devices may be suited to their specific applications, they do not provide the benefits achievable through use of the present invention.

SUMMARY OF THE INVENTION

A portable cart for solar energy conversion is provided, comprising a cart having at least two wheels, wherein the cart includes a frame having a floor, a panel receiving assembly, and a panel holding assembly, and wherein the panel holding assembly is removably attachable to the panel receiving assembly. The cart includes one or more photovoltaic solar panels operatively attached to the panel holding assembly; a charge controller electrically connected to the solar panels; one or more batteries electrically connected to the charge controller; and at least one inverter electrically connected to the batteries and to the charge controller, wherein the inverter is adapted to convert direct current to alternating current.

Optionally, the frame further includes a charging receptacle electrically connected to the batteries, wherein the charging receptacle is adapted to receive a direct current from an external source, such as an automobile.

In a preferred embodiment, the panel holding assembly comprises a panel holder connected to a base, and wherein the panel holder is oriented at a predetermined angular position relative to the base. More preferably, the panel holder is hingeably connected to the base, and the panel holder can be locked into one or more predetermined angular positions relative to the base.

Optionally, the charge controller further includes a battery temperature sensor electrically connected to the batteries. The frame may also include a current display meter electrically connected between the charge controller and the batteries.

The frame may further include a master disconnect switch electrically connected between the charge controller and the batteries.

In a preferred embodiment, the panel receiving assembly includes two or more receiving members, and the panel holding assembly includes two or more mounting members wherein the mounting members are telescopingly slidable relative to the receiving members. More preferably, the mounting members are lockable relative to the receiving members.

For ease of portability, the frame further includes at least one telescoping handle, and preferably at least two such handles extending perpendicular to the wheel axes.

To protect the cart and its components from weather, the cart preferably includes a protective cover. Similarly, the frame may further include battery cases adapted to sealably enclose the batteries.

Although the specifications for the invention may vary depending upon the requirements of the user, a typical embodiment may employ 12-volt batteries capable of energy storage of at least 100 amp-hours each Likewise, each inverter should include at least two 120-volt AC receptacles and should be capable of at least 1000 Watts of continuous power, although greater power output from 2500 Watts to 5000 Watts is possible depending upon the components selected. Also, each of the photovoltaic solar panels should be a polycrystalline silicon panel capable of producing at least 100 Watts maximum power.

In consideration of the fact that the panel holding assembly is readily detachable from the frame of the cart, an external stand is also provided and capable of receiving the panel holding assembly in at least two positions. Therefore, the external stand includes a first receiving mount and a second receiving mount, wherein the first receiving mount permits orientation of the photovoltaic solar panels at a first angle for winter usage, and wherein the second receiving mount permits orientation of the photovoltaic solar panels at a second angle for summer usage.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements.

DETAILED DESCRIPTION OF THE INVENTION

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Figure 1:
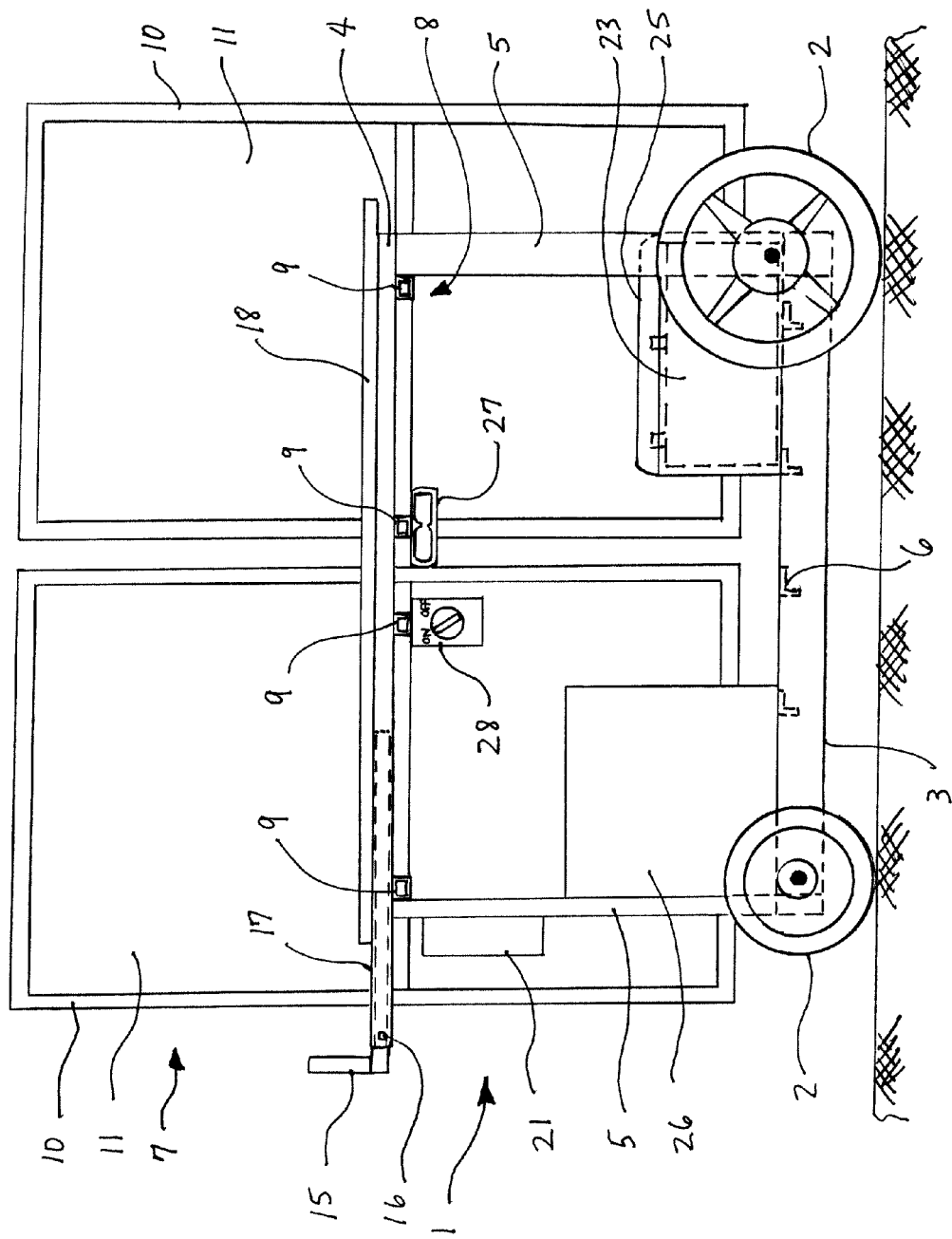
FIG. 1 shows a side view of one embodiment of the present invention, depicting the portable cart with the panel holding assembly attached.
Figure 2:
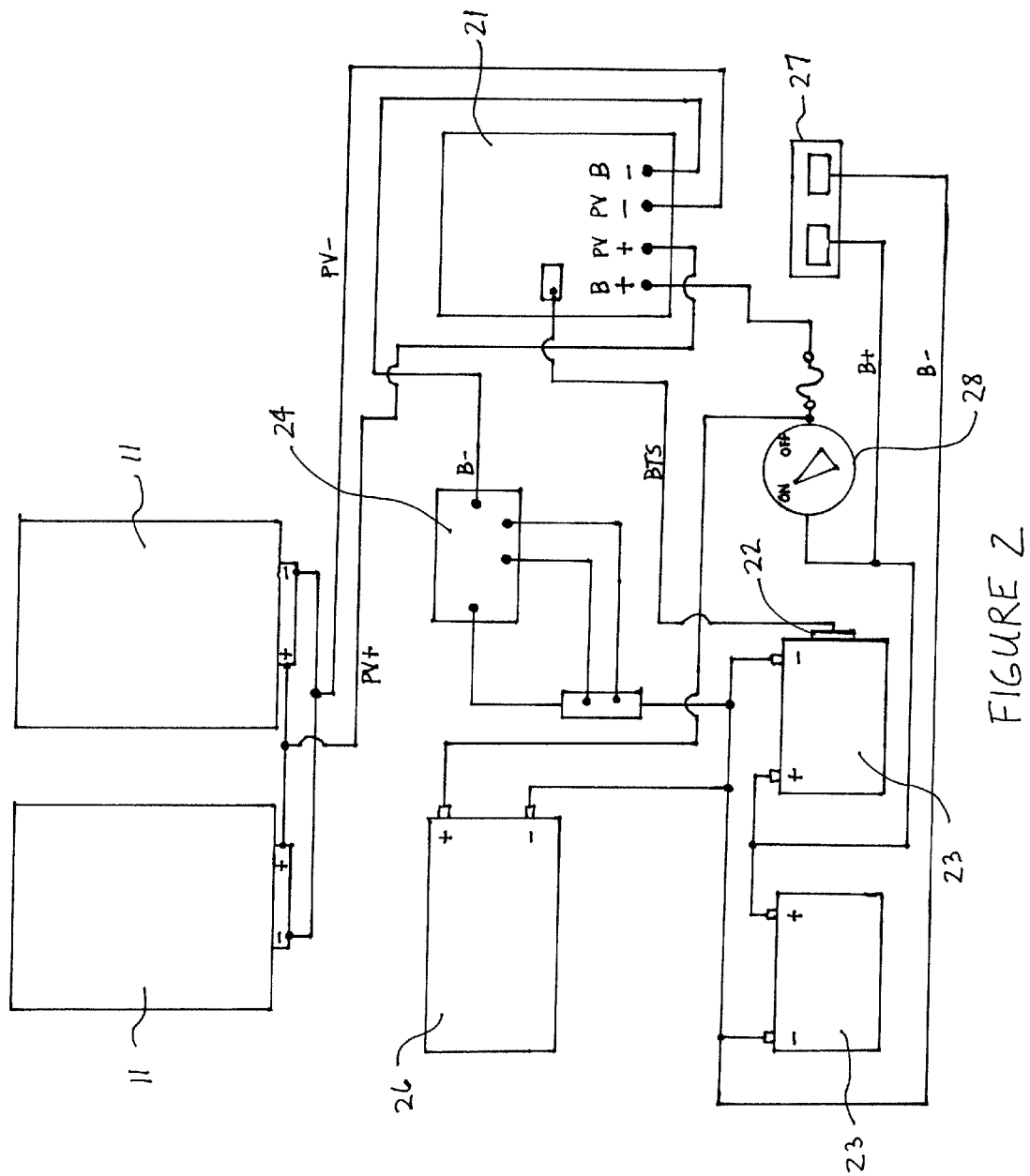
FIG. 2 shows a schematic diagram of the electrical components and connections of the embodiment of FIG. 1.
Figure 3:
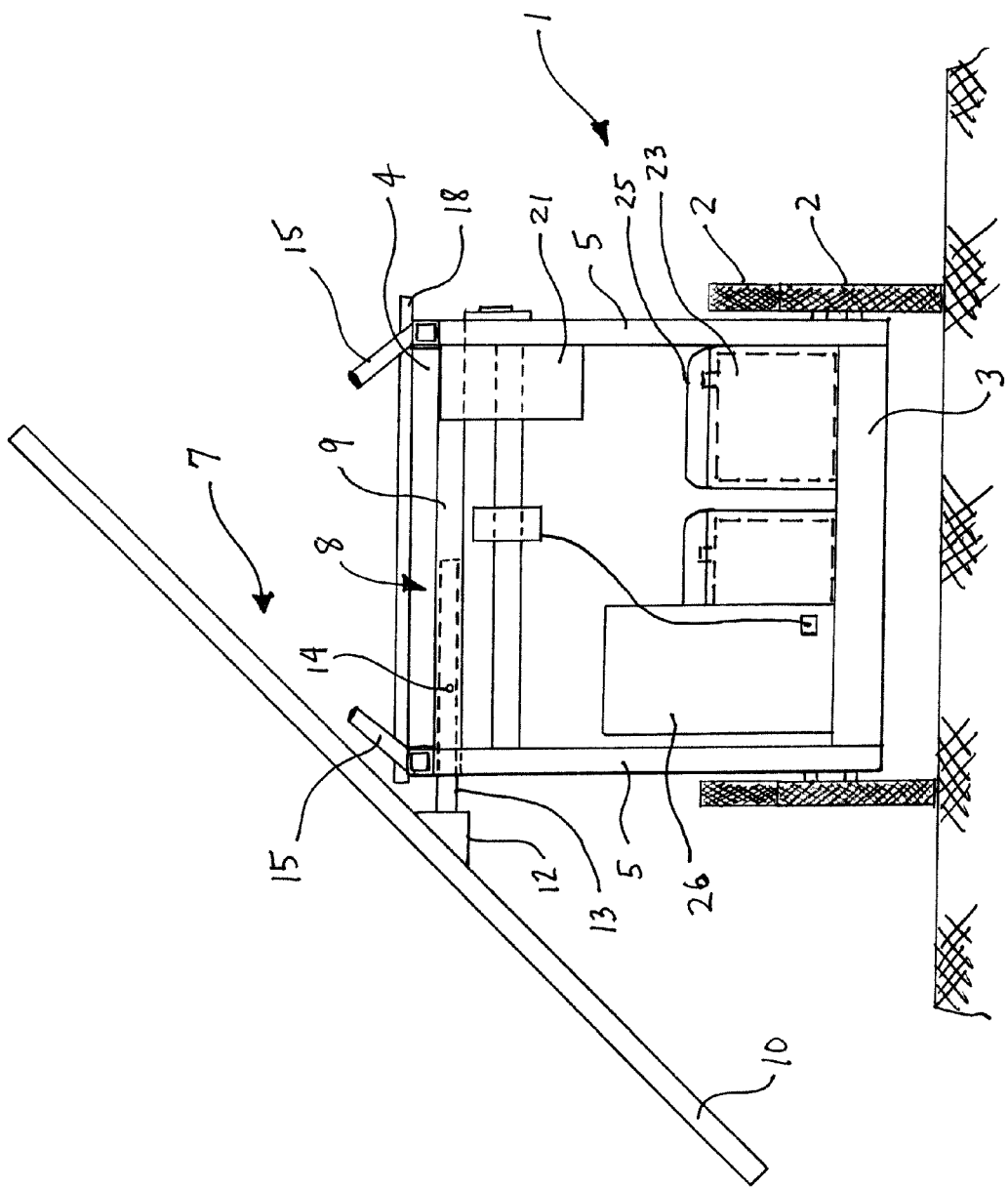
FIG. 3 shows an front view of the embodiment of FIG. 1.

Turning now to FIGS. 1 and 2, a preferred embodiment of the invention is shown. With respect to FIG. 1, electrical wiring and other incidental connections are omitted for clarity. However, FIG. 2 illustrates an electrical schematic diagram showing the required electrical connections required to operate the invention. Generally, the invention comprises a cart 1 having at least two wheels 2 on a single axis, although two axles are preferred as shown for maximum maneuverability. Large wheels, such as at least 12" diameter for the rear wheels are desired for smoother movement of the cart 1 over rough terrain. Optionally, the axes may be eliminated, and caster wheels may be substituted. In either case, it is desirable for the cart 1 to include a means for locking the wheels to prevent rotation when the cart 1 must remain stationary. The cart 1 is generally constructed from a tubular frame comprised mostly of 1"×1" square steel tubing and 1"×2" steel tubing welded together to form a rigid and strong structure. In the specific embodiment shown in FIGS. 1 and 3, the cart 1 includes a four horizontal bottom members 3 welded together to form a rectangular base. Similarly, the cart 1 also includes four horizontal top members 4 welded together to form a rectangular top. The body of the cart 1 is completed by four vertical members 5 welded between the top members 4 and the bottom members 3 at the corners as shown in FIGS. 1 and 3. Typical wall thickness for such tubing may be 1/16", although other sizes may also be suitable if the desired strength and rigidity are achieved.

The cart 1 includes a floor, which floor may be comprised simply of a number of additional square tubing or L-shaped channel members 6 welded across the bottom members 3 of the frame. Four such channel members 6 are shown in FIG. 1 and are located at positions which enable support for one or more inverters and batteries, as described below. The upper portion of the cart 1 includes a panel receiving assembly 8, which can comprise a plurality of square tubing members 9 (as previously described) welded directly underneath the top members 4 of the frame. In the preferred embodiment, the panel receiving assembly 8 can support at least one, but preferably two, large photovoltaic (PV) solar panels (as described below), each of which is supported within its own panel holding assembly 7. Thus, the panel receiving assembly 8 for each panel holding assembly 7 can be a pair of tubular parallel receiving members 9, as shown in FIGS. 1 and 3.

The panel holding assembly 7 is designed to accommodate a single PV panel 11, and it is removably attachable to the panel receiving assembly 8. Each PV panel 11 may be attached to its respective panel holder 10 via conventional fasteners in a manner intended to provide a secure fit. In a preferred embodiment, the panel holding assembly 7 comprises a panel holder 10 connected to a base 12, and wherein the panel holder 10 is oriented at a predetermined angular position relative to the base 12 and to the ground. For most purposes, the panel holder 10 may be oriented at about 45 degrees from the base 12, which will be suitable for many purposes. More preferably, the panel holder 10 may be hingeably connected to the base 12, and the panel holder 10 can be locked into one or more predetermined angular positions relative to the base 12 and to the ground. In that manner, angular positions may be chosen so as to maximize the energy received from the sun during the summer months or winter months, as applicable.

In a preferred embodiment, the panel receiving assembly 8 includes two or more receiving members 9, and the panel holding assembly 7 includes two or more equally spaced mounting members 13, wherein each of the mounting members 13 is telescopingly slidable relative to its corresponding receiving member 9. The tubing for the receiving members 9 should be substantially parallel to the wheel axes, thus allowing the panels 11 to be oriented on the side of the cart 1, and facilitating movement of the cart 1 through a minimum of space. More preferably, the mounting members 13 are lockable relative to the receiving members 9 by a removable pin 14 inserted into holes formed into the receiving members 9 and the mounting members 13. Importantly, this design places most of the weight of the PV panels 11 generally over the center of the cart 1, which reduces the risk of inadvertent tipping of the cart 1. Each of the two panel holding assemblies 7 may be removed or added independently, such that a single PV panel 11 may be used for occasions when lower energy requirements are present.

For ease of portability, the cart 1 further includes at least one telescoping handle 15, and preferably at least two such handles 15, extending perpendicular to the wheel axes. As can be seen best in FIG. 1, the handles 15 telescopingly slide within extended portions 17 of the tubular top members 4 of the cart 1 and may be locked in either the extended or retracted position as desired by a locking pin 16 inserted into holes formed in the top members 4 and the handles 15. To protect the cart 1 and its components from weather, the cart 1 preferably includes a protective cover 18, such as an aluminum or plastic sheet over the open top members 4 of the frame.

To generate the required energy, the cart 1 includes one or more photovoltaic (PV) solar panels 11 operatively attached to the panel holding assembly 7. In the preferred embodiment, the design includes at least two such PV panels 11, each in its own panel holder 10. Each of the PV panels 11 should be a polycrystalline silicon panel capable of producing at least 100 Watts maximum power, although panels producing at least 200 Watts are more preferred.

Referring specifically to the schematic diagram of FIG. 2, a charge controller 21 is attached to the cart 1, and it is electrically connected to the solar panels 11 via suitable wires and connectors common in the solar industry. Optionally, the charge controller 21 further includes a battery temperature sensor 22 electrically connected to one or more batteries 23, which sensor can direct the charge controller 21 to reduce the charge to the batteries 23 under high-temperature conditions. The cart 1 may also include a current display meter 24 electrically connected between the charge controller 21 and the batteries 23.

The batteries 23 are positioned on the floor 6 of the cart 1, and are preferably enclosed within battery cases 25 adapted to sealably enclose the batteries. The batteries 23 are electrically connected to the appropriate terminals on the charge controller 21 as indicated in FIG. 2. Although the specifications for the invention may vary depending upon the requirements of the user, a typical embodiment may employ 12-volt batteries 23 capable of energy storage of at least 100 amp-hours each. The cart 1 includes at least one inverter 26 electrically connected to the batteries 23 and to the charge controller 21, wherein the inverter 26 is adapted to convert direct current to alternating current. Each inverter 26 should include at least two 120-volt AC receptacles and should be capable of at least 1000 Watts of continuous power, although most users will require 2500-5000 Watts or greater.

Optionally, the cart 1 further includes a charging receptacle 27 electrically connected to the batteries 23, wherein the charging receptacle 27 is adapted to receive a direct current from an external source, such as an automobile. Thus, when the batteries 23 are low on power, such as on extended overcast days or during the night, a vehicle may be used to charge the batteries 23 from a 12-volt DC source. Optionally, the cart 1 may further include a master disconnect switch 28 electrically connected between the charge controller 21 and the batteries 23, pursuant to requirements of applicable codes, including the National Electrical Code (NFPA 70).

Figures 4A, 4B:
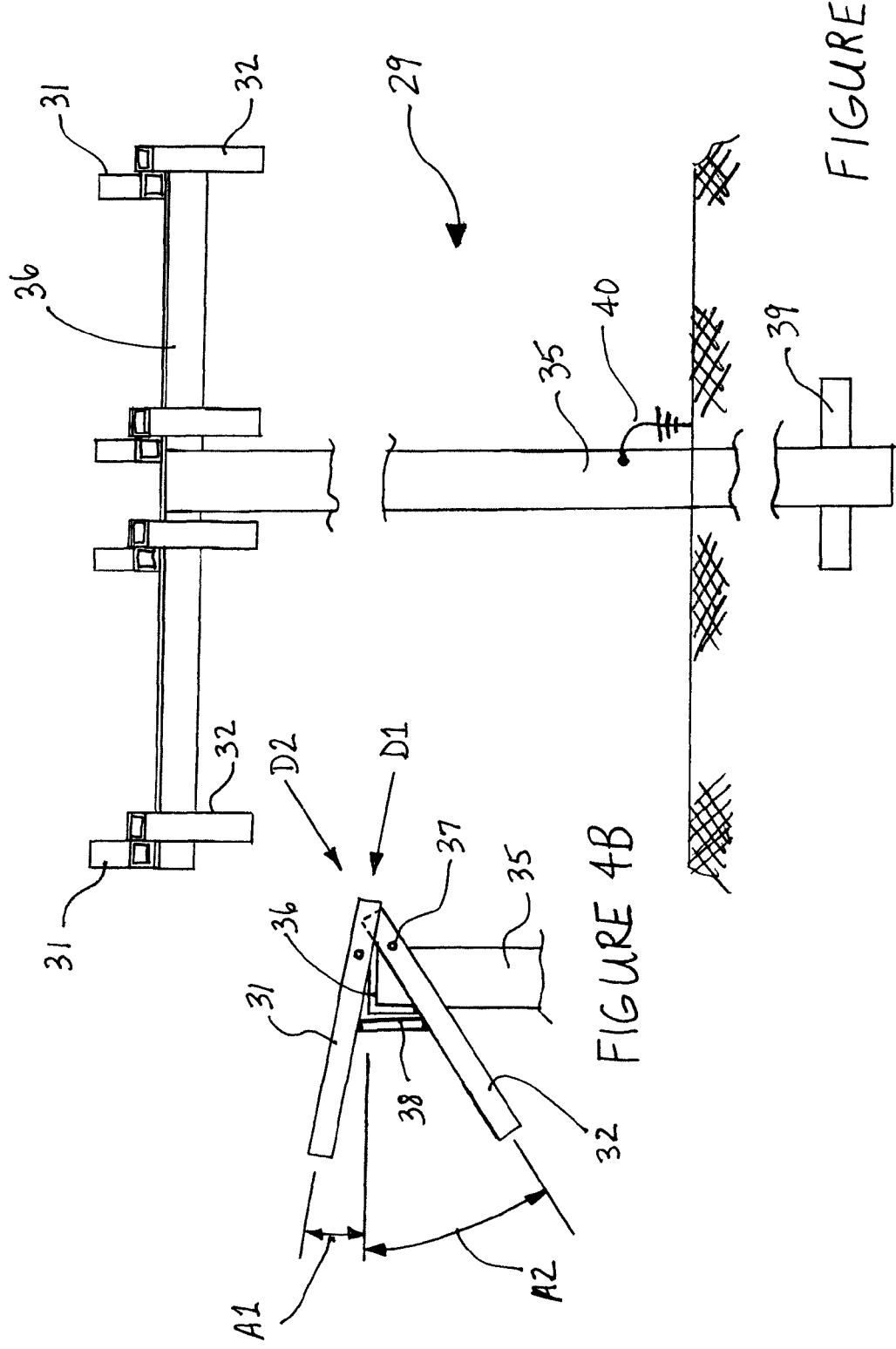
FIG. 4A shows an elevation view of the external stand.
FIG. 4B shows a detailed view of the mounting portion of the external stand.

With specific reference to FIGS. 4A and 4B, in consideration of the fact that the panel holding assembly 7 is readily detachable from the panel receiving assembly 8 of the cart 1, an external stand 29 is also provided and capable of receiving the panel holding assembly 7 in at least two positions. Therefore, the external stand 29 simply includes a pole 35 having a horizontal support member 36 in the form of an L-shaped channel which is welded to the pole 35. The horizontal support member 36 includes first receiving mounts 31 and second receiving mounts 32, both of which are welded to the horizontal support member 36. Each of the first and second receiving mounts 31, 32, telescopingly receive the mounting members 13 of the panel holding assembly 7 in the insertion directions D1, D2 shown in FIG. 4B. In other words, the first and second receiving mounts 31, 32 function identically to the receiving members 9 on the cart 1, although in separate angular orientations. Locking pins 37 may be used through holes formed in the first and second receiving members 31, 32 to secure the panel holding assembly 7.

The first receiving mounts 31 permit orientation of the PV panels 11 at a first angle for winter usage when the sun follows a path that is lower in the sky, requiring that the first receiving mounts 31 be oriented at angle A1 above horizontal Likewise, the second receiving mounts 32 permit orientation of the PV panels 11 at a second angle for summer usage when the sun follows a path that is higher in the sky, requiring that the second receiving mounts 32 be oriented at angle A2 below horizontal. An additional separation member 38 may be attached between the receiving members 31, 32 to establish the proper relative angles. As will be appreciated, the optimum angles A1 and A2 are dependent upon the precise geographic location of the user.

For permanent installations, it is recommended to secure the external stand 29 in the ground by concrete. Optionally, anti-rotation tabs 39 may be secured to the pole 35 to help prevent rotation of the stand 29 during strong winds. Additionally, the external stand 29 should also be grounded 40 to avoid damage to the PV panels 11 due to lightning strikes.

All references cited in this specification are herein incorporated by reference as though each reference was specifically and individually indicated to be incorporated by reference. The citation of any reference is for its disclosure prior to the filing date and should not be construed as an admission that the present invention is not entitled to antedate such reference by virtue of prior invention.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

The invention claimed is:

1. A portable cart for solar energy conversion, comprising:
   (a) a cart having at least two wheels, wherein the cart includes a frame having a floor, a panel receiving assembly, and a panel holding assembly, and wherein the panel holding assembly is removably attachable to the panel receiving assembly;
   (b) one or more photovoltaic solar panels operatively attached to the panel holding assembly;
   (c) a charge controller electrically connected to the solar panels;
   (d) one or more batteries electrically connected to the charge controller; and
   (e) at least one inverter electrically connected to the batteries and to the charge controller, wherein the inverter is adapted to convert direct current to alternating current; and
   wherein the frame further includes a charging receptacle electrically connected to the batteries, wherein the charging receptacle is adapted to receive a direct current from an external source.

2. The apparatus of claim 1, wherein the panel holding assembly comprises a panel holder connected to a base, and wherein the panel holder is oriented at a predetermined angular position relative to the base.

3. The apparatus of claim 1, wherein the charge controller further includes a battery temperature sensor electrically connected to the batteries.

4. The apparatus of claim 1, wherein the frame further includes a current display meter electrically connected between the charge controller and the batteries.

5. The apparatus of claim 1, wherein the frame further includes a master disconnect switch electrically connected between the charge controller and the batteries.

6. The apparatus of claim 1, wherein the panel receiving assembly includes two or more receiving members, and wherein the panel holding assembly includes two or more mounting members, and wherein the mounting members are telescopingly slidable relative to the receiving members.

7. The apparatus of claim 6, wherein the mounting members are lockable relative to the receiving members.

8. The apparatus of claim 1, wherein the frame further includes at least one telescoping handle.

9. The apparatus of claim 1, wherein the frame further includes at least one battery case adapted to sealably enclose one of the batteries.

10. The apparatus of claim 1, wherein the frame further includes a protective cover.

11. The apparatus of claim 1, wherein the panel holding assembly comprises a panel holder hingeably connected to a base, and wherein the panel holder can be locked into one or more predetermined angular positions relative to the base.

12. The apparatus of claim 1, wherein each of the batteries is a 12-volt battery capable of energy storage of at least 100 amp-hours.

13. The apparatus of claim 1, wherein the inverter includes at least two 120-volt AC receptacles and is capable of at least 1000 Watts of continuous power.

14. The apparatus of claim 1, wherein each of the photovoltaic solar panels is a polycrystalline silicon panel capable of producing at least 100 Watts maximum power.

15. The apparatus of claim 1, further including an external stand capable of receiving the panel holding assembly at a location away from the cart.

16. The apparatus of claim 15, wherein the external stand includes a first receiving mount and a second receiving mount, and wherein the first receiving mount permits orientation of the photovoltaic solar panels at a first angle for winter usage, and wherein the second receiving mount permits orientation of the photovoltaic solar panels at a second angle for summer usage.

* * * * *